United States Patent [19]

Saggese

[11] 4,378,032

[45] Mar. 29, 1983

[54] SLOTTED CONCRETE PIPE

[76] Inventor: Vincent A. Saggese, 15 Pleasant View Dr., Bayville, N.Y. 11709

[21] Appl. No.: 219,330

[22] Filed: Dec. 22, 1980

Related U.S. Application Data

[62] Division of Ser. No. 89,955, Oct. 31, 1979.

[51] Int. Cl.³ .............................................. F16L 9/08
[52] U.S. Cl. ...................................... 138/175; 138/92; 138/103; 138/176; 405/43
[58] Field of Search .............. 138/103, 175, 176, 92; 405/43, 45; 264/34, 333, 228; 249/61, 52, 11

[56] References Cited

U.S. PATENT DOCUMENTS

| | | | |
|---|---|---|---|
| 2,009,163 | 7/1935 | Chesley | 405/43 |
| 2,602,469 | 7/1952 | Whiting | 138/176 |
| 2,660,199 | 11/1953 | Montgomery | 138/176 X |
| 3,166,631 | 1/1965 | Reiland | 138/92 |
| 3,275,040 | 9/1966 | Hausmann et al. | 138/176 |
| 3,348,433 | 10/1967 | Mayes | 138/176 X |

*Primary Examiner*—James E. Bryant, III
*Attorney, Agent, or Firm*—Kane, Dalsimer, Kane, Sullivan & Kurucz

[57] ABSTRACT

Concrete pipe including a hollow tube of concrete with a grid of reinforcing bars embedded therein. A plurality of inserts are embedded in the concrete pipe in between the bars of the grid and have passageways therethrough to form slots between the interior of the concrete pipe and the exterior thereof at predetermined locations to form slotted concrete pipe.

3 Claims, 16 Drawing Figures

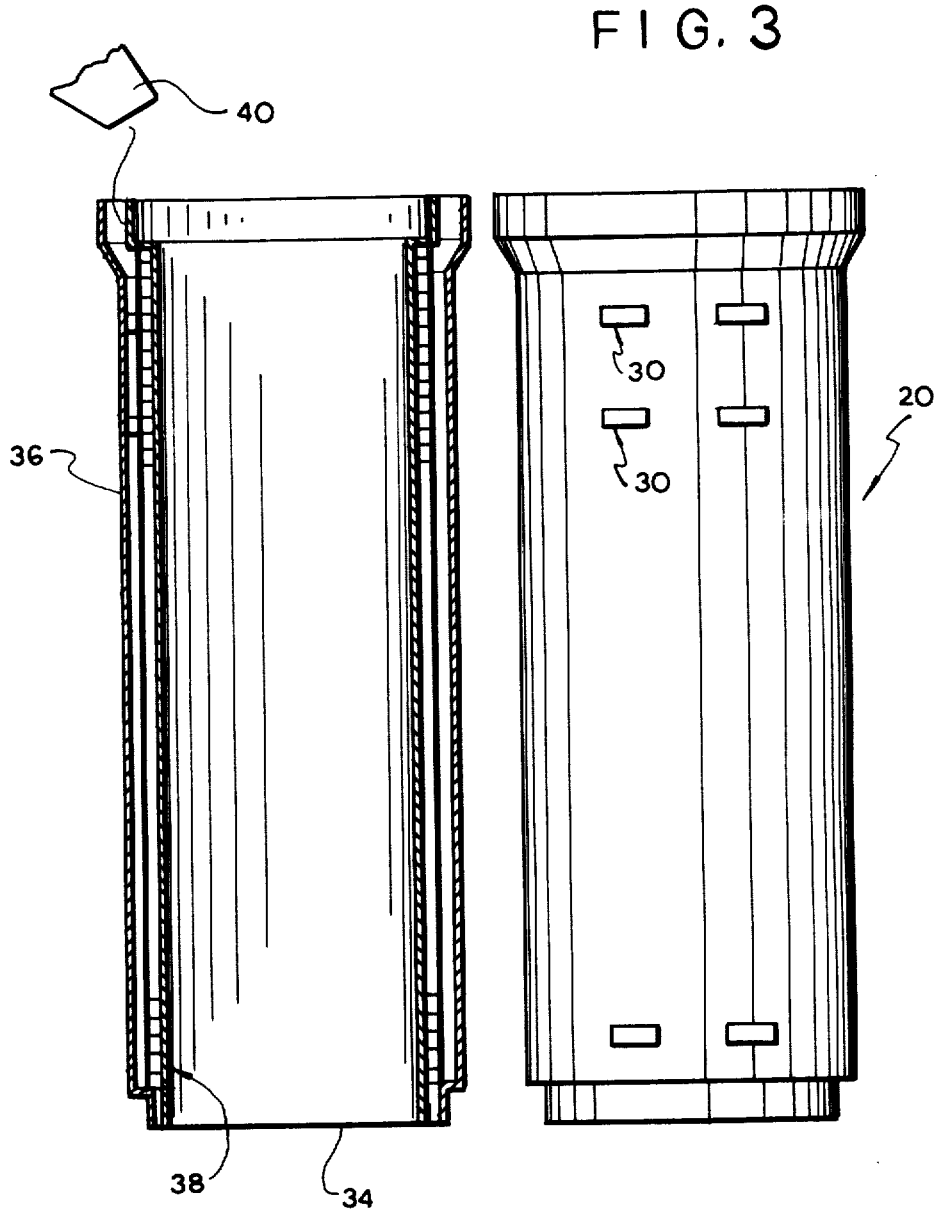

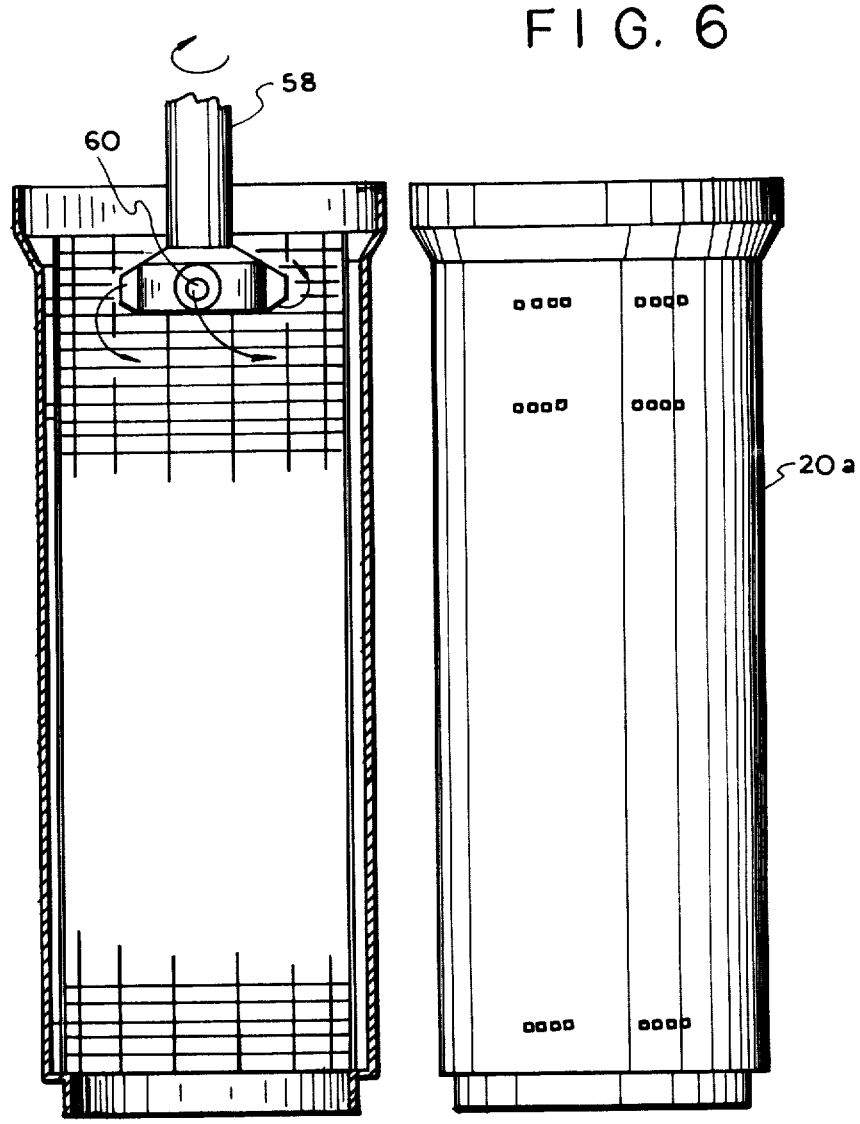

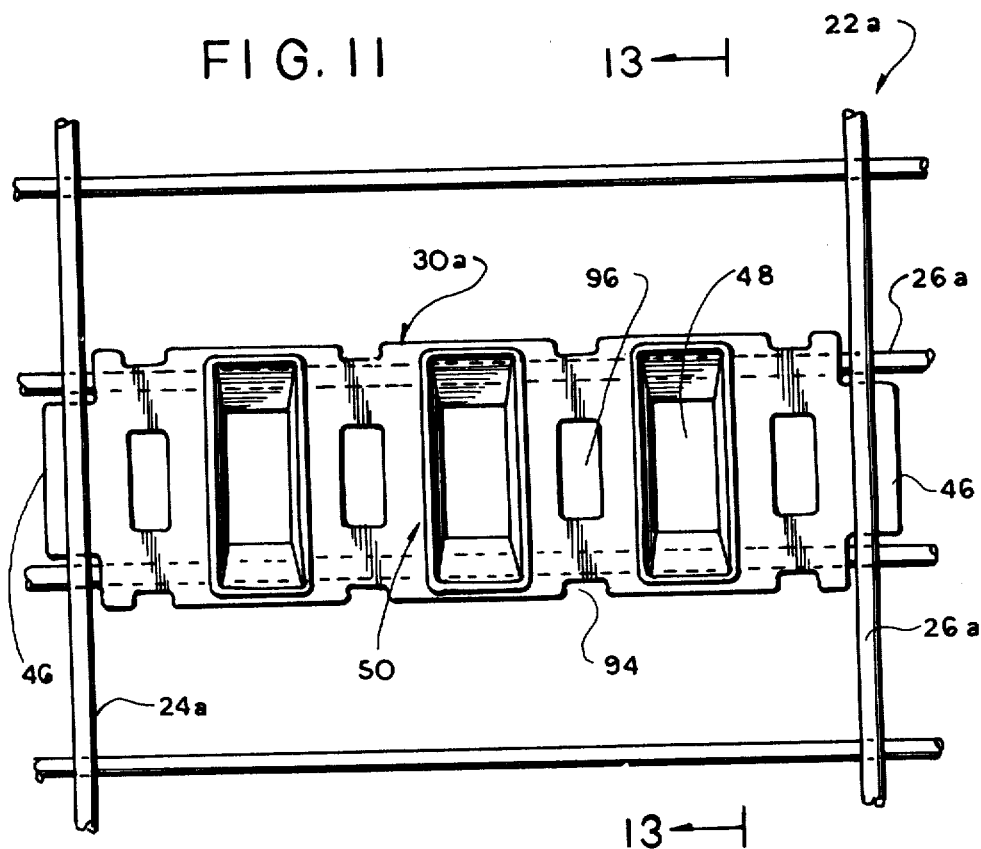
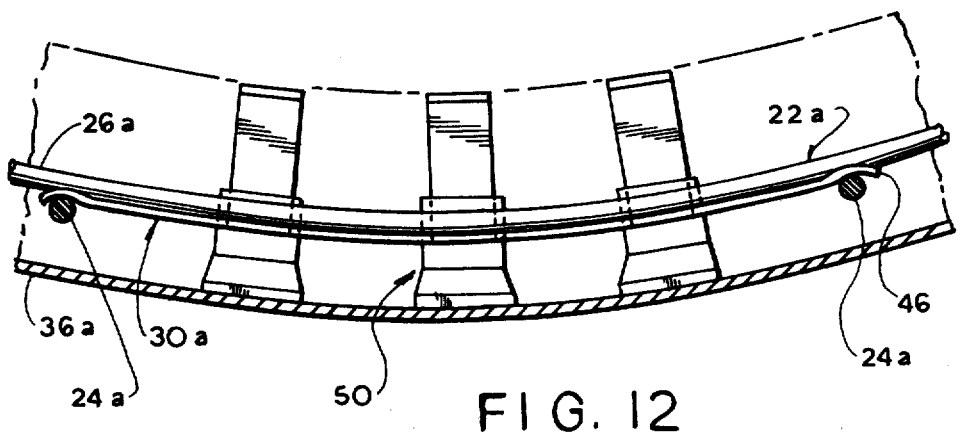

SLOTTED CONCRETE PIPE

This is a division of application Ser. No. 089,955, filed Oct. 31, 1979.

BACKGROUND OF THE INVENTION

Cast or molded concrete pipe is used conventionally for drainage purposes in connection with sewage and leaching fields in particular. This type of pipe which ranges in size from small diameters to quite large diameters has been formed conventionally by casting or molding a solid or unperforated concrete pipe, a normal type of fluid conduit, and then perforating the pipe in a convenient manner.

One way in which the perforations have been formed is to extend large cores diametrically across the molds when the pipe is formed so as to produce apertures in opposite sides of the pipe after the concrete sets in the molds and around the cores. Naturally, thereafter, it is necessary to remove the cores before the pipe can be removed from the mold. Removal frequently causes damage to the pipes resulting in an inferior product. Also, the cores can interfere with the reinforcing rods in the pipes.

A second method of forming perforations in use today is to punch or cut holes in the formed pipe. This is done indiscriminately in the field in many cases and causes damage to the reinforcing rods because as the perforations are formed the rods are often broken or cut. This provides for a weakened and damaged concrete pipe. Also, the concrete will often deteriorate around the cut or punched holes and affect the longevity and efficiency of the pipe in use. Damage to the reinforcing bars during formation of the perforations can be caused by negligence, lack of knowledge on the part of the persons forming the perforations or because the location of the intersecting bars is not known when the choice of location of the perforations is made. In the latter case, it is a matter of luck whether the perforation is made between bars or at a location of a bar necessitating the cutting or damaging of the bar or bars contacted.

In any event, formation of perforated or slotted pipe for drainage or leaching field systems by the methods known today clearly results in an inferior and undesirable product. There is clearly a need for an improved slotted concrete pipe of high quality and undamaged integrity and one which can be quickly and efficiently formed by existing pipe forming methods without materially adding to the cost of the forming process.

SUMMARY OF THE INVENTION

It is an objective of the present invention to provide a slotted concrete pipe formed by mounting a plurality of inserts in the mold along with a grid of reinforcing bars and thereafter applying concrete to the mold surrounding and capturing the reinforcing bars and inserts in predetermined fixed position. The pipe is then removed from the mold as a finished product. The inserts formed through passageways through the pipe wall to provide the necessary perforations or slots.

It is an objective to provide inserts in the system which can be easily attached to the grid of reinforcing bars to fix them in predetermined locations within the mold prior to introduction of the concrete so that when the concrete sets the inserts will be at the desired location for the slots in the finished concrete pipe.

It is an objective to provide inserts with clips in the form of spring-like members which clip the inserts to the bars and hold them in fixed position. The inserts are designed to conform to the cylindrical configuration of the pipe while retaining a somewhat rectangular configuration for strength and support with a through passageway for access to the interior and exterior of the pipe formed around each insert.

The types of inserts contemplated by the invention include ones with means to facilitate their positioning within the interstices of the grid of reinforcing bars and attachment to the reinforcing bars while providing a through passageway between the interior and exterior of the finished pipe. For example, one embodiment employs a resilient strip for resiliently interweaving and locking with the grid of bars. The strip is provided with a plurality of apertures to receive plugs therethrough in frictional interengagement. Each plug is open at both ends and provides a through passageway between the interior and exterior of the pipe when attached to the strip and the strip is attached to the grid.

In certain pipe forming methods, it is desirable to have one or both of the ends of the inserts closed while the concrete is being applied and is permitted to set to avoid plugging of the holes through the inserts and, accordingly, the perforations used to form the slots in the finished pipe. For this purpose, end plugs can be formed on the open ends or edges of the inserts to close the passageway therethrough and they can be removed in a conventional manner such as by cutting or punching after the pipe is formed thereby opening the through passageway for each perforation or slot. This is particularly useful in pipe forming procedures such as the centrifugal force procedure for application of the concrete within the mold.

The inserts can be formed of a variety of different types of inexpensive materials having the desired strength and resiliency where necessary for use. For example, common types of plastics such as polypropylene or polyethylene have been found to be effective for the insert material. For attachment means resilient metal or plastic spring clips or strips can be employed for the various embodiments. The reinforcing rods would be of a conventional nature such as commonly used iron or steel bars employed with concrete pipes.

In summary, a unique insert is present for use in forming slotted concrete pipe. The pipe is of the type which is in the form of a hollow tube of concrete with a grid of reinforcing bars embedded therein. A plurality of the unique inserts are also embedded in the concrete pipe. Each insert has a through passageway to form a slot between the interior of the concrete pipe and the exterior thereof. The inserts are formed as the pipe is formed and remain embedded in the pipe during use. No further manufacturing steps are required.

Preferably, the inserts are mounted in the pipe without affecting the integrity of the grid of reinforcing bars. The inserts can be fixed in position with respect to the bars and the utlimate pipe by attaching them to the bars during the forming of the pipe. The inserts are designed so that they can be utilized in conventional types of casting or molding pipe procedures such as pouring or centrifugation of the concrete in application to a mold.

With the above objectives among others in mind, reference is made to the attached drawings.

BRIEF DESCRIPTION OF THE DRAWINGS

In the drawings:

FIG. 2 is a sectional elevation view thereof with the reinforcing bars and inserts in the mold and concrete being poured into the mold to form the pipe;

FIG. 3 is a side elevation view of the resultant formed slotted concrete pipe removed from the mold of FIG. 2;

FIG. 5 is a sectional elevation view of the assembly in the centrifugation mold and concrete being applied by centrifugal force;

FIG. 6 is a side elevation view of the resultant formed slotted concrete pipe removed from the mold of FIG. 5;

FIG. 11 is an enlarged end elevation view of an insert of the embodiment of FIGS. 4-6 mounted to the grid of reinforcing bars;

FIG. 12 is a top plan view thereof;

DETAILED DESCRIPTION

There are several well known methods of forming concrete pipe of the type which is used in leaching fields and for drainage of sewage or water from large catch basins and similar structures. Two of the more conventional ways is by pouring concrete into a mold containing suitable reinforcing rods and permitting the concrete to set and form a pipe which can then be removed from the mold for use. Another conventional way is by placing reinforcing rods in a mold and then applying concrete along the wall of the mold by a centrifugal force device whereupon the concrete sets and can be removed from the mold for use as a pipe. Another conventional way is by the vibrating method. The pipe of the present invention can be formed in either of these two conventional processes without the necessity of alteration or change of the molding or casting processes. This is true with respect to all of the different types of inserts of the invention used for forming slots or perforations in concrete pipe.

Figure 1:
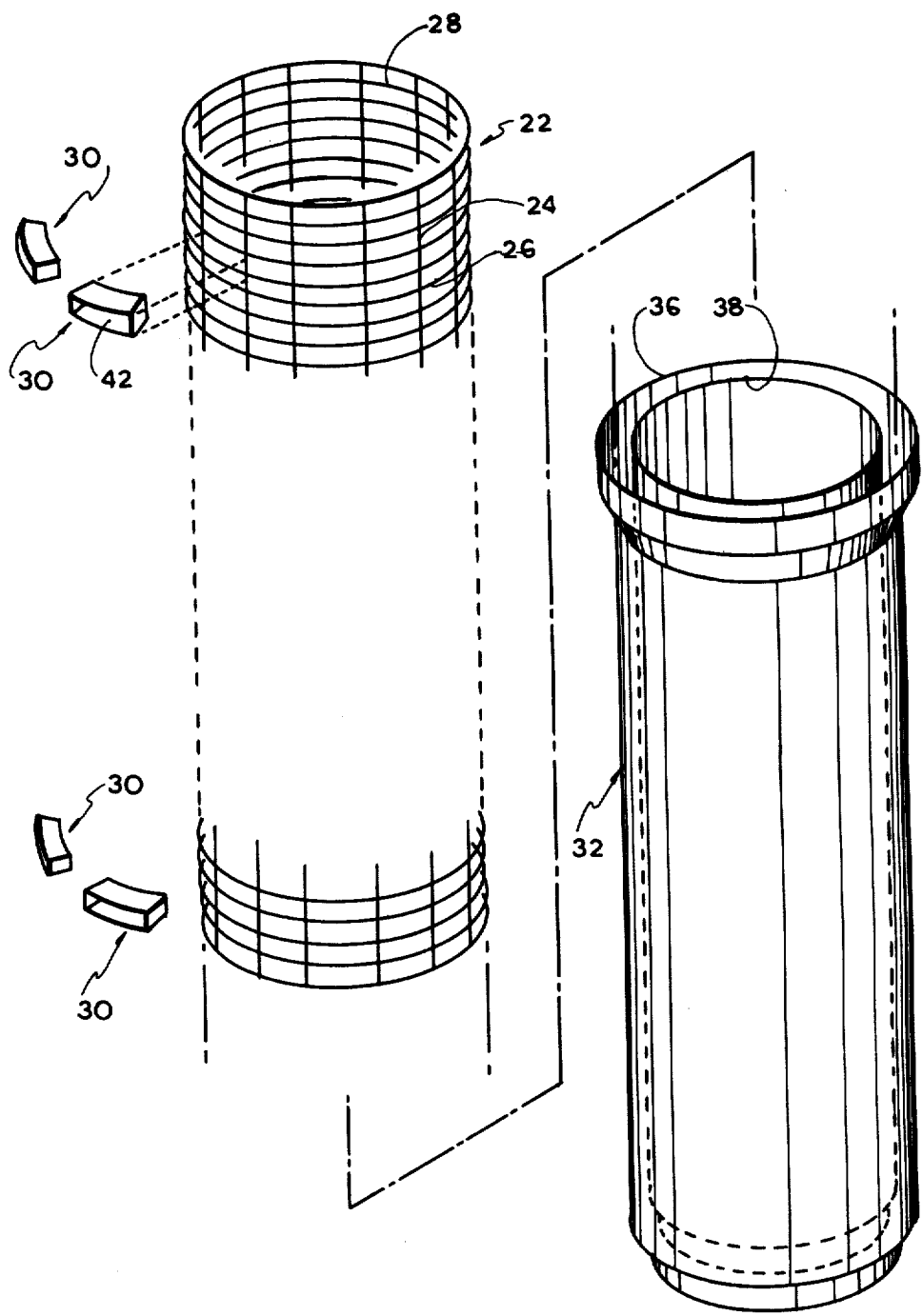
FIG. 1 is a perspective view of the method of forming a concrete pipe of the invention showing an initial step of application of inserts to a grid of reinforcing bars and then insertion of the assembly into a mold.

An example of a concrete pipe 20 of the present invention employing one of the various types of inserts of the present invention and which is formed by a concrete pouring method is depicted in FIGS. 1-3.

In FIG. 1, a grid 22 of reinforcing bars in the configuration of the pipe is provided. Conventionally these bars are formed of steel or iron and are interconnected by welding or any similar conventional process. The grid is formed with a plurality of spaced parallel axially running bars 24 intersecting a plurality of circular circumferential parallel spaced bars 26. The bars 24 are interconnected with the bars 26 at their points of intersection. Spaces or interstices 28 are formed between the bars and are generally rectangular in configuration. The grid is open at both ends to conform to the ultimate configuration of the pipe 20.

A plurality of inserts 30 are mounted in the spaces 28 between the bars 24 and 26. The number of inserts 30 and the arrangement is a matter of choice. The purpose is to locate perforations or slots for the pipe. This arrangement of the grid and the inserts 30 is then positioned in a mold 32 having the configuration for the ultimate pipe. As shown in FIG. 2, the mold has a base 34, an outer wall 36 and an inner wall 38 to form a chamber therebetween for receipt of the grid and inserts and the concrete poured from a conventional concrete pourer 40. The concrete fills the space surrounding the grid and insert assembly and is permitted to set to form a concrete pipe 20 which is removed from the mold in the final configuration for use as depicted in FIG. 3. The inserts 30 and the grid 22 are permanently mounted in the pipe in position to form slots for drainage purposes. If desired, the inserts 30 can be initially formed with end plugs sealing the through passageway 42 of each insert to prevent plugging of this through passageway by concrete during pouring. Thereafter, the end plugs would be removed providing a through passageway 42 between the interior and exterior of the finished concrete pipe 20.

Figure 4:
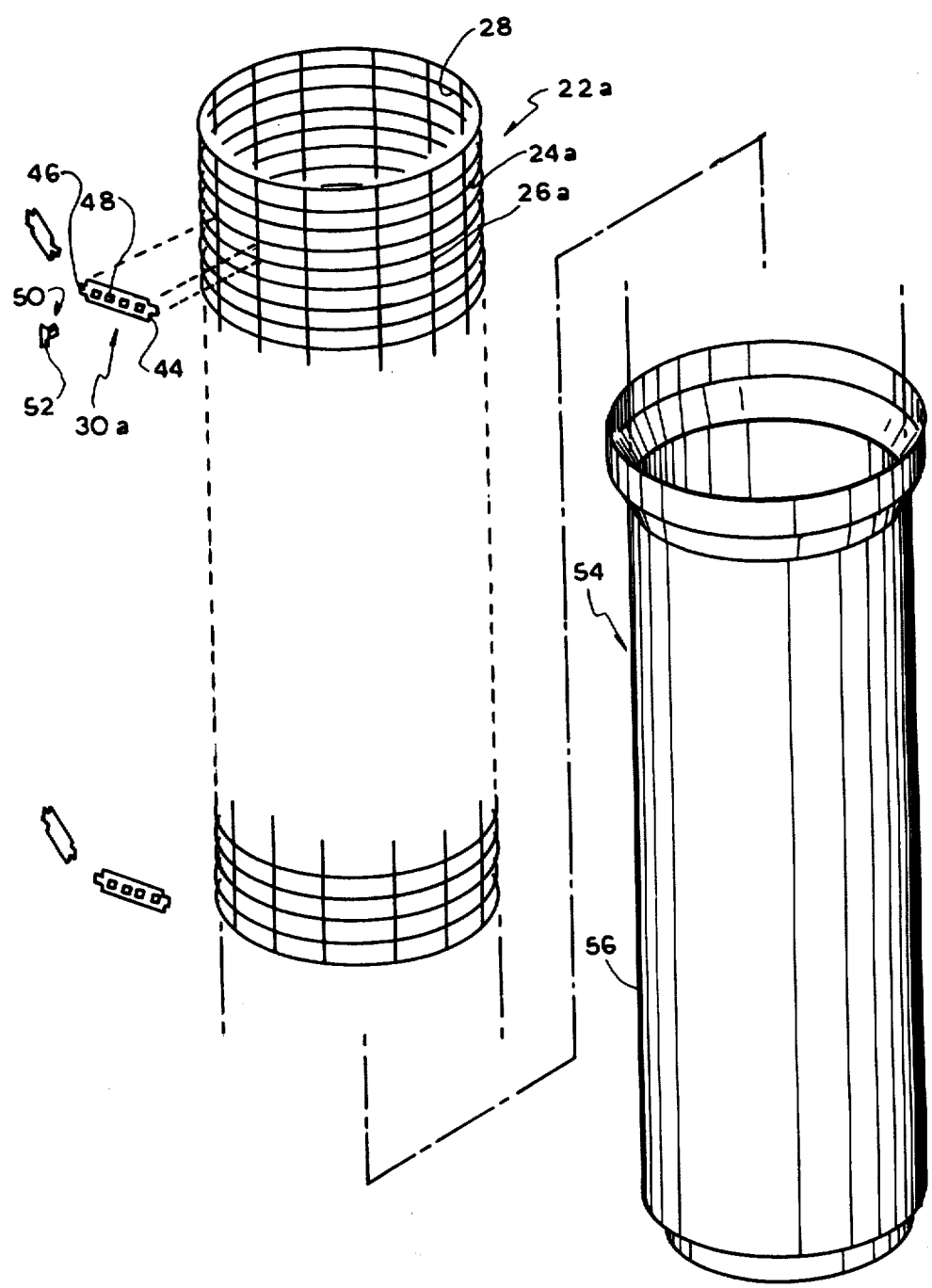
FIG. 4 is a perspective view of an alternative method of forming the concrete pipe of the invention and showing an alternative type of insert being applied to the grid of reinforcing bars and the combination being inserted into a centrifugation mold.
Figure 7:
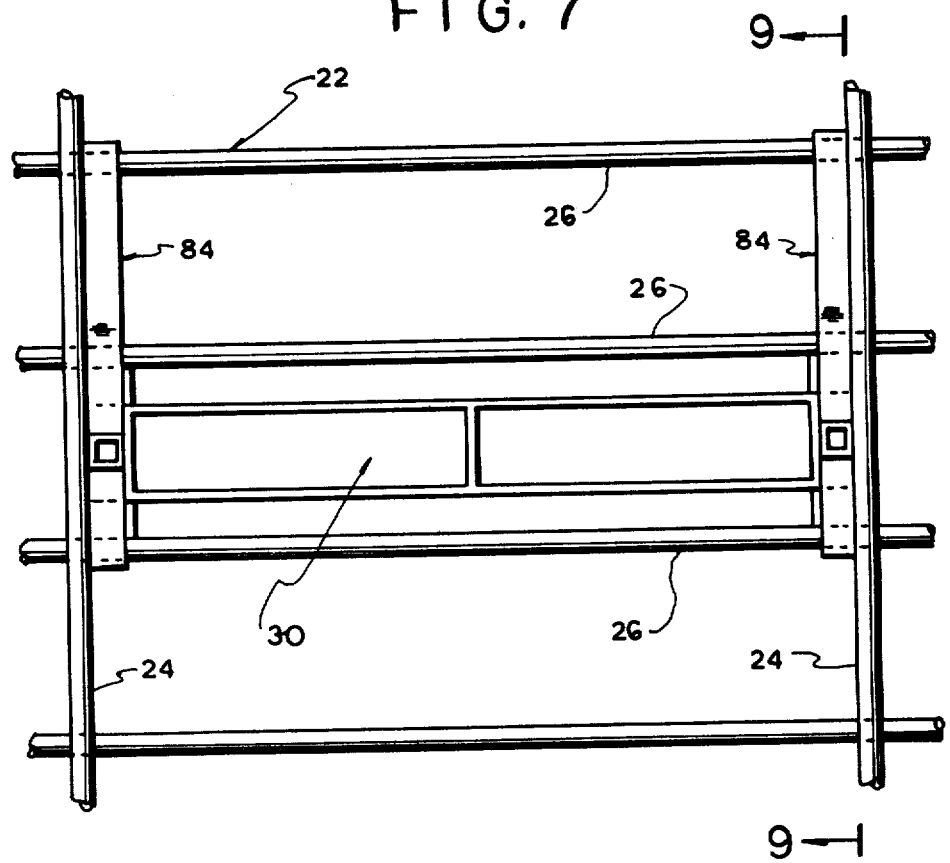
FIG. 7 is an enlarged end elevation view of the insert of the process of FIGS. 1-3 mounted to the grid of reinforcing bars.
Figure 8:
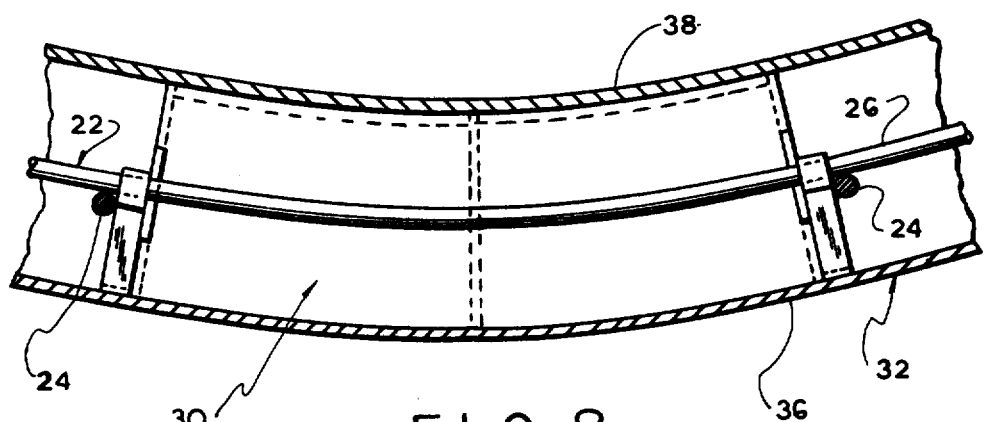
FIG. 8 is a top plan view thereof.
Figure 9:
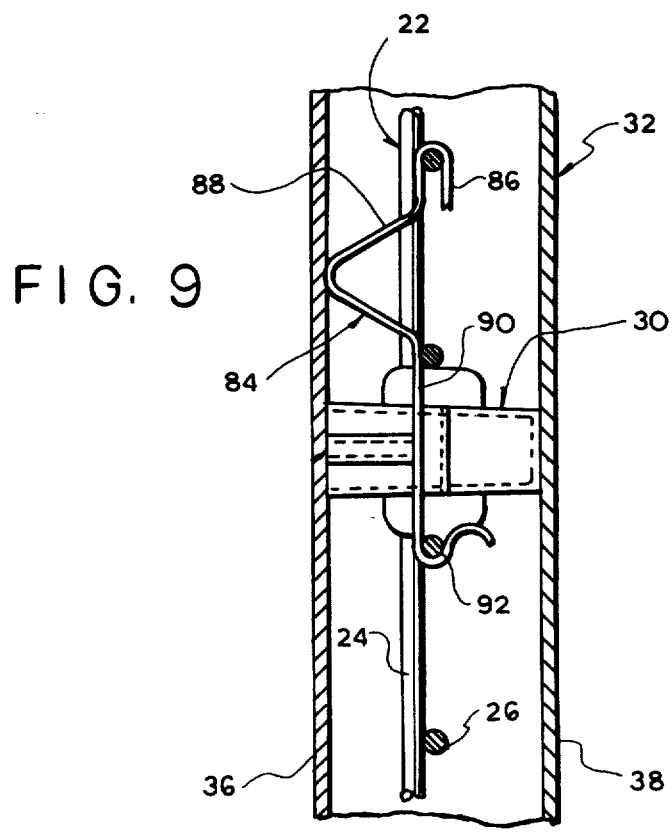
FIG. 9 is a sectional side view thereof taken along the plane of line 9—9 of FIG. 7.
Figure 10:
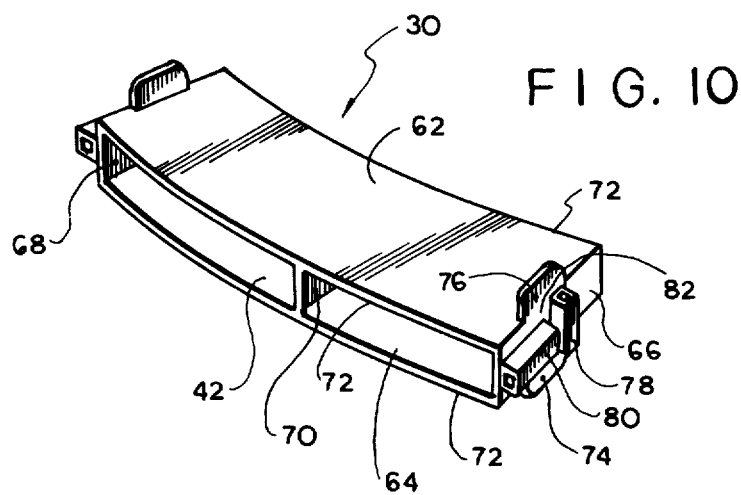
FIG. 10 is a perspective view of the insert of FIGS. 7-9.
Figure 13:
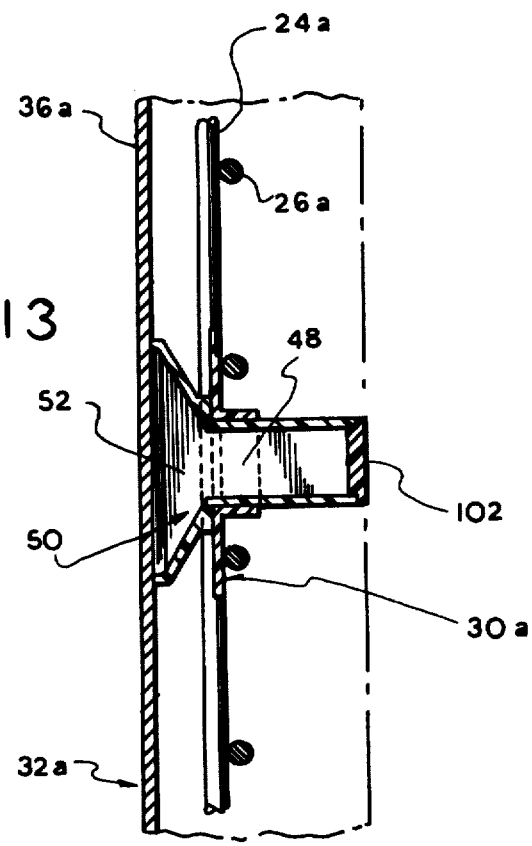
FIG. 13 is a sectional side view thereof.
Figure 14:
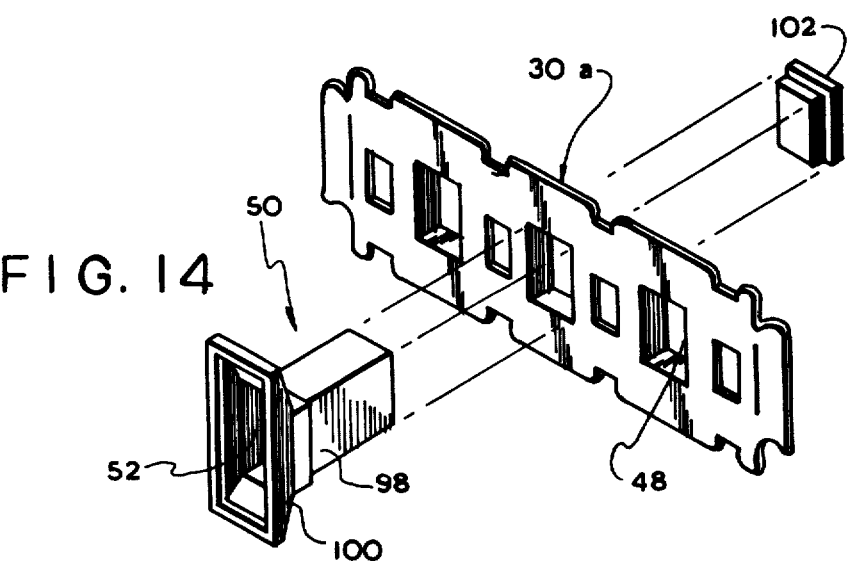
FIG. 14 is an exploded perspective view thereof.

An example of the concrete pipe 20a of the invention is depicted in FIGS. 4-6. This pipe 20a has a different type of insert utilized and is formed by the conventional type of centrifugation method for applying the concrete to the mold. Similar parts to the embodiment of FIGS. 1-3 bear similar numbers with the addition of the subscript a. The same type of grid 22a is formed with the intersecting arrangement of bars 24a and 26a so as to form at their interstices spaces 28a. Inserts 30a are positioned in spaces 28a and are mounted to bars 24a and 26a of grid 22a. Each of the inserts 30a includes a mounting strip 44 of flexible material with end tabs 46 to resiliently engage with adjacent axial bars 26a. A group of apertures 48 are in the strip. Each aperture 48 is adapted to have a plug 50 extended therethrough. Each plug 50 is open at both ends, the inner and outer edges, to provide a through passageway 52 for the slot in the finished concrete pipe 20a. The plugs are frictionally mounted in the apertures 48 and the strips are applied to the grid in a predetermined arrangement to provide for the appropriate slot locations for the finished pipe 20a. The assembly of the interengaged grid 22a and inserts 30a is then inserted into a mold 54. The mold 54 has a longitudinal circumferential side wall 56 conforming to the ultimate configuration of the concrete pipe being formed. A conventional type of centrifugal applicator 58 is then utilized. It travels along the length of mold 54 and by rotation expels under centrifugal force concrete through aperture 60 whereby the concrete is directed against the inner surface of the side wall 56 where it sets to form a tubular pipe. The concrete surrounds the assembly of grid 22a and inserts 30a which become embedded in the hardened concrete pipe. The assembly is then removed from the mold 54 and is ready to use as pipe 20a with an appropriate drainage slot at the location of each insert 30a.

As discussed in connection with the embodiment of FIGS. 1-3, each plug 50 of insert 30a may contain end plugs closing off the through passageway 52 during the assembly process until the concrete pipe has been formed. Thereafter, the end plugs can be removed in a conventional manner such as by cutting or punching the plugs out opening passageways 52 to provide the slots in the pipe 20a.

FIGS. 7-10 show the details of insert 30 depicted in connection with the embodiment of FIGS. 1-3. Insert 30 is substantially rectangular in configuration with a relatively flat top wall 62 and a corresponding flat bottom wall 64. The top and bottom walls are substantially parallel and are interconnected by upright side walls 66 and 68. The ultimate rectangular or box-like configuration has a through passageway 42 therethrough to provide the slot for the pipe 20. As a matter of choice an intermediate support 70 can be included to maintain the spacing between walls 62 and 64 when the insert is subjected to forces from the surrounding concrete in the pipe. It has been found that a conventional low cost relatively inert material works effectively for insert 30 such as a plastic, for example polypropylene or polyethylene. Use of a plastic material such as polypropylene or polyethylene facilitates formation of the insert and also adds longevity to the insert as it resides in the pipe.

It should also be noted that the inner and outer edges 72 of the top wall 62 and the bottom wall 64 are arcuate in configuration to conform with the radius of curvature of the pipe. This facilitates introduction of the insert into the mold and forming of the pipe with the inserts extending from the inner surface to the outer surface of the pipe wall to form the through passageway for the slot. Insert 30 is also smaller than the rectangular space formed by adjacent pairs of circumferentially and axially extending bars.

Insert 30 includes a downward projecting tab 74 on each side and an upwardly extending tab 76 in alignment therewith at each side. These pairs of actually projecting tabs form engaging surfaces with the adjacent circumferential bars 26 of grid 22. This provides for tight frictional interengagement in the axial direction for the insert 30 as it is positioned between adjacent bars 26.

Extending from each side wall 66 and 68 is an upstanding stop 78 spaced from a laterally extending stop 80. The space 82 between stop 78 and stop 80 forms a pathway for a central portion of a mounting spring clip 84. In this way, a spring clip 84 is positioned at each side of insert 30. The spring clip is formed of a resilient material such as spring steel or plastic and has an upper free end in the shape of a hook 86 for extension around a circumferential grid bar 26. Hook 86 extends into a somewhat U-shaped section 88 to be embedded in the concrete and to provide resilience for the spring clip. U-shape section 88 extends into a straight section 90 which extends through space 82 to capture one side of insert 30. Straight section 90 terminates in a lateral arcuate tab 92 which engages with a circumferential bar 26. The length of spring clip 84 is chosen so that end 86 and end 92 can be mounted on circumferential bars 26 with one intermediate circumferential bar 26 therebetween. Thus, by use of the spacing tabs 74 and 76 and the spring clips 84 at both sides of insert 30, the insert is mounted to the grid 22. It should be noted that this mounting is accomplished without the need for interferring with the integrity or altering the shape or configuration of the grid or any of its members.

As stated above, end plugs can be positioned at the location of through passageway 42 at both the inner and outer edges of insert 30 which can be removed after the concrete has been applied in surrounding relationship with respect to the interengaged grid 22 and inserts 30. The result is a slotted pipe 20 as depicted in FIG. 3.

The alternative insert 30a shown in connection with the embodiment of FIGS. 4-6 is depicted in detail in FIGS. 11-14. Strip 44 is formed of a resilient metal or plastic material and includes a pair of end tabs 46 which are arcuate to partially surround a pair of adjacent axial bars 24a. In turn, the strip is wide enough so that it has sufficient width to engage with a pair of adjacent circumferential bars 26a. In this manner, the resilient strip can be wedged in the interstices of the adjacent pairs of axial bars 24a and circumferential bars 26a so as to provide mounting means for the insert on the grid 22a. To facilitate provision of the desired resilience for the strip 44, it is provided with suitable notches 94 adjacent opposing longitudinal edges and in alignment with central holes 96. There are four central holes 96 for each strip 44 and between each pair of central holes 96 is an aperture 48 which conforms to the shape of a plug 50 to be inserted therethrough for frictional engagement therewith. Thus, there are three apertures 48 and accordingly three plugs 50 can be used for each insert 30a. Plug 50 has a hollow rectangular shaped main body portion 98 extending into a wider trumpet portion 100. Plug 50 can be formed of one piece or two frictionally interengaged or adhesively bonded pieces. Plugs 50 are formed of plastic and so is strip 44. Portions 98 and 100 have through passageways which form a through continuous passageway 52 for plug 50 which in turn forms a slot for the completed concrete pipe 20a. As described above, each plug 50 can be provided with end plugs to protect passageway 52 while the pipe is being formed. As example of an end plug is depicted in connection with this embodiment as end plug 102. After formation of the pipe 20a, end plug 102 and similar end plugs for one or both ends of all inserts 30a can be removed thereby providing the through slots for the pipe at the desired locations. Once again the number of inserts 30a is a matter of choice and their location is also a matter of choice. They are permanently embedded in the concrete pipe to provide permanent slots for the pipe. They do not have any deleterious effect on the bars of grid 22a and are mounted to the grid bars in the interstices of the bars. As with all of the embodiments in connection with this invention, the concrete is formed around the inserts which are permanently mounted in the concrete necessitating no removal after the concrete of the pipe has set.

Figure 15:
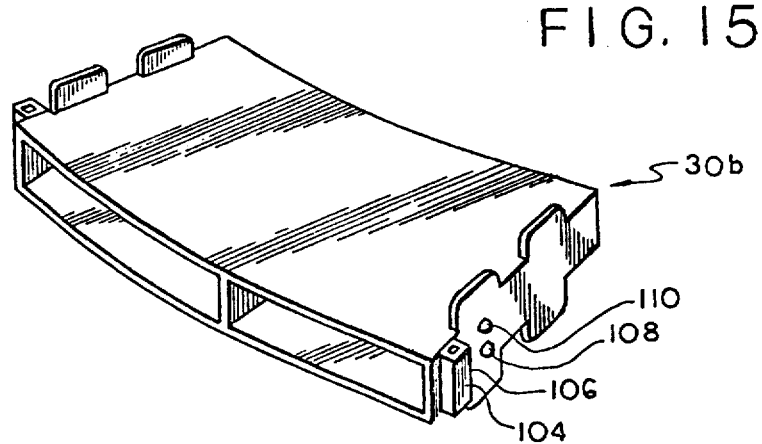
FIG. 15 is a perspective view of a further alternative embodiment of the insert of the invention.
Figure 16:
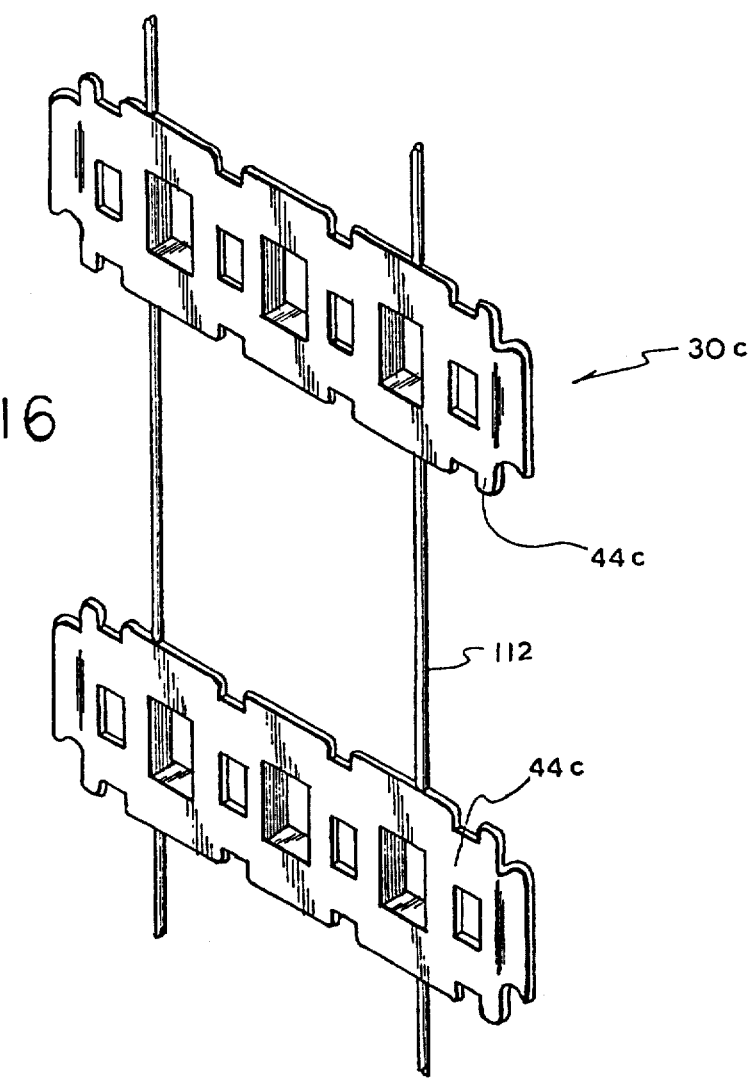
FIG. 16 is a fragmentary perspective view of an alternative embodiment of a ladder arrangement of mounting strips for inserts of the invention.

Two additional modifications are depicted in FIGS. 15 and 16. A modified insert 30b is shown in FIG. 15 and is somewhat similar to the insert 30 discussed above. However, in place of the stops 78 and 80 forming space 82 for the spring clip 84, a lateral projecting guideway 104 is provided at each end of insert 30b and spaced from the inner surface 106 of guideway 104 is a pair of buttons 108 and 110. The buttons 108 and 110 are small projections from each side of the insert 30b and are designed to snap-fit past an axial bar 26 to capture the bar between buttons 108 and 110 and the inner surface 106 of guideway 104. With an arrangement of this type on either end of insert 30b, there is no need for an additional component such as spring clip 84 in connection with insert 30. Otherwise, insert 30b is mounted in the same manner with respect to grid 22 with similar upwardly and downwardly extending space is to frictionally engage with adjacent circumferential ribs 24 to complete the mounting of the insert on the grid.

FIG. 16 shows a modification for insert 30a discussed above. It results in an insert arrangement 30c which is identical with respect to insert 30a with the exception that each adjacent pair of strips 44c are interconnected in a ladder arrangement by a pair of parallel resilient tie rods 112. This ladder arrangement of insert strips facilitates assembly of the inserts to the grid 22a. The arrangement of strips of insert 30c are spaced so that they mate with appropriate interstices of the bars of the grid. The strips 44c are mounted in the same manner as the strips 44 with respect to resilient coupling to the grid bars. Appropriate plugs are then inserted through the appropriate apertures in the strips to produce the resultant inserts for the ultimate concrete pipe.

Naturally in addition to polypropylene and polyethylene other conventional substitutes therefor well known in the art are acceptable for use in forming the inserts. Also, certain metals such as aluminum can be used.

It should also be noted that extending tabs 76, 76c and 74, 74c at each side of the inserts 30a and 30c ensure that the insert is sufficiently spaced from the ribs so that concrete can completely surround the reinforcing bars thereby facilitating formation of the most desirable concrete pipe structure.

The slots of the depicted embodiments are rectangular in configuration, however, it should be kept in mind that other configurations can also be easily utilized such as round slots.

The width of the inserts is a matter of choice depending upon the thickness of pipe wall being constructed.

In certain environments, the embodiments of inserts 30a and 30c are desirable and for other environments the embodiments of inserts 30b and 30d are desirable. The inserts are interchangeable independent of the concrete forming method used. For example, in certain drainage situations the wider trumpet opening on the outer end of the plugs of inserts 30b and 30d facilitates operation of the pipe in drainage use. The trumpet configuration also provides an undersurface ledge where it joins the reduced diameter portion which engages with the strip through which the plug extends providing improved stability for the assembly.

Thus the several aforenoted objects and advantages are most effectively attained. Although several somewhat preferred embodiments have been disclosed and described in detail herein, It should be understood that this invention is in no sense limited thereby and its scope is to be determined by that of the appended claims.

I claim:

1. A concrete pipe comprising; a hollow tube of concrete formed with a grid of reinforcing bars embedded therein, a plurality of inserts embedded in the concrete pipe and having through passageways to form slots between the interior of the concrete pipe and the exterior thereof at predetermined locations to form slotted concrete pipe, and each insert is located in between the bars of the grid and is attached to adjacent bars of the grid within the concrete pipe.

2. The invention in accordance with claim 1 wherein each insert is a rectangularly-shaped hollow member open at the inner and outer edges and is attached to the bars of the grid within the concrete pipe by means of at least one clip.

3. The invention is accordance with claim 1 wherein each insert is formed of a resilient strip of material with apertures therein, the strip resiliently coupled with adjacent bars of the grid, at least one hollow plug open at the inner and outer edge and inserted through an aperture of the strip and held in position by the strip so that the both open edges of the plug communicate with the interior and exterior of the concrete pipe to provide a through passageway.

* * * * *